(12) United States Patent
Li et al.

(10) Patent No.: US 8,722,154 B2
(45) Date of Patent: May 13, 2014

(54) COMPOSITION AND METHOD FOR PREPARATION OF ELECTRO-CONDUCTIVE POLYMER SURFACES

(75) Inventors: Sheng Li, Victoria (AU); Wojciech Stanislaw Gutowski, Victoria (AU); Wei Dong Yang, Victoria (AU); Andrew Simon Hastings, Victoria (AU); Mark Edward Spicer, Victoria (AU); Con Filippou, Victoria (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 313 days.

(21) Appl. No.: 13/062,843

(22) PCT Filed: Sep. 22, 2009

(86) PCT No.: PCT/AU2009/001252
§ 371 (c)(1),
(2), (4) Date: May 12, 2011

(87) PCT Pub. No.: WO2010/031143
PCT Pub. Date: Mar. 25, 2010

(65) Prior Publication Data
US 2011/0206856 A1 Aug. 25, 2011

(30) Foreign Application Priority Data

Sep. 22, 2008 (AU) ............................. 2008904926

(51) Int. Cl.
*B05D 1/06* (2006.01)
*B05D 5/06* (2006.01)
*C08G 69/04* (2006.01)
*C08G 73/08* (2006.01)

(52) U.S. Cl.
USPC ............ 427/475; 427/258; 528/310; 525/419

(58) Field of Classification Search
USPC ......... 427/540, 535, 532, 533, 258, 485, 475; 528/310; 525/419
See application file for complete search history.

(56) References Cited

U.S. PATENT DOCUMENTS

| 3,030,325 | A | | 4/1962 | Scopp |
| 3,473,946 | A | | 10/1969 | Roney |
| 3,969,547 | A | | 7/1976 | Isawa et al. |
| 4,026,851 | A | | 5/1977 | Greene |
| 4,266,561 | A | | 5/1981 | Litzinger |
| 4,536,525 | A | | 8/1985 | Freese et al. |
| 5,280,084 | A | | 1/1994 | Paul |
| 5,606,010 | A | * | 2/1997 | Erhan et al. .................. 528/229 |
| 5,936,046 | A | * | 8/1999 | Ghosh ........................... 525/449 |
| 6,620,463 | B2 | * | 9/2003 | Stay .............................. 427/458 |
| 6,800,331 | B2 | * | 10/2004 | Bilyk et al. ................... 427/387 |
| 2008/0164439 | A1 | | 7/2008 | Fang et al. |

FOREIGN PATENT DOCUMENTS

| CN | 87 1 02267 A | 10/1987 |
| CN | 1939993 A | 4/2007 |
| DE | 4103959 A1 | 8/1992 |
| JP | 2003-213148 A | 7/2003 |
| JP | 2004-217872 A | 8/2004 |
| WO | 92/22912 | 12/1992 |
| WO | 2008/061687 A1 | 5/2008 |

OTHER PUBLICATIONS

JP2004217872_English_Translation.
JP2003213148_English_Translation.
Examination Report dated Feb. 13, 2013 for Application No. NZ17556/11.
Chinese Examination Report dated Mar. 13, 2013 for Application No. CN 20098013711.1.
Search Report for Application No. CN 20098013711.1.
Espacenet English abstract of CN 87 1 02267 A.
Espacenet English abstract of CN 1939993 A.

* cited by examiner

*Primary Examiner* — Timothy Meeks
*Assistant Examiner* — Ann Disarro
(74) *Attorney, Agent, or Firm* — Ladas & Parry LLP

(57) ABSTRACT

A method of electrostatic spraying of a polymer surface involves oxidation and treating the oxidized surface with a polyamine and an electroconductivity modifying agent which contains a mono-carboxylic acid of from one to 12 carbon atoms.

15 Claims, 1 Drawing Sheet

CLASSIFICATION OF ADHESION TEST RESULTS

| Classification | Percent Area Removed | Surface of Cross-Cut Area From Which Flaking has Occurred for Six Parallel Cuts and Adhesion Range by Percent |
|---|---|---|
| 5B | 0% None | |
| 4B | Less than 5% | |
| 3B | 5-15% | |
| 2B | 15-35% | |
| 1B | 35-65% | |
| 0B | Greater than 65% | |

COMPOSITION AND METHOD FOR PREPARATION OF ELECTRO-CONDUCTIVE POLYMER SURFACES

FIELD

The present invention relates to a composition and method for electrostatic coating, such as electrostatic powder coating of a polymeric surface and for enhancing of adhesion of electrostatically applied coatings, such as powder coatings to the polymeric substrate.

BACKGROUND

Powder coating is a method providing very high solid coating efficiency. Due to this attribute, powder coating has the potential to avoid solid waste and volatile organic carrier (VOC) waste generated from the currently used wet painting processes where up to 70% paint losses result, depending on the complexity of the painted component.

Powder coating has been widely used in coating of metals due to their inherent conductivity which is essential for creating conditions required for electrostatic deposition of powder or wet coating on a surface, and the high temperature readily applicable to any metal component without the danger of adverse effects of high baking temperatures typically exceeding 180° C. The electrostatically charged powder resin can be readily deposited on the metal surface using opposing charges applied to the metal substrate and coating's particles. As a consequence of the above, an even, suitable coating layer is formed on the metal surface.

Powder coating technology has also been used to provide desirable surface protection and decorative finishes to wood-based products such as particle boards or MDF boards. The workable level of surface conductivity is typically achieved by controlling surface water contents through rapid pre-heating wood-based substrates leading to increased moisture concentration (and hence increased conductivity) of the surface layer, or alternatively by electro-conductive additives (e.g. salts) in the board formulation. The relatively high tolerance of wood-based panels to higher baking temperatures, typically in access of 140° C., also facilitated the use of powder coating technology to this category of materials.

There are several technical challenges which constitute major barriers for the application of powder coating technology to polymers, and in particular to the chemically inert polymers which are the basis of commercial plastic components, especially those fabricated from polyolefin-based blends.

Polymeric materials, especially non polar polymeric materials such as polyolefins are in general excellent insulators due to their surface resistivity typically higher than $10^{16}$ Ω/square for polymers and their blends compounded without addition of conductive fillers. Hence, they are not suitable for the electrostatic coating such as powder coating where the electrically charged resin powder requires electrically conductive or semi-conductive substrate to facilitate creation of the oppositely charged surface essential for electrostatic transfer and deposition of the powder resin onto a conductive substrate.

There is also a need for powder coating processes which may use low baking temperature resins curable in the 110-140° C. range for coating polyolefin based plastics and within the time of less than 20-40 minutes, due to lower thermal distortion temperatures for this group of polymer. Lower curing temperature under 110° C. is required for polymers exhibits thermal distortion temperature lower than 110° C., such as ABS and others. This is due to the fact that many polyolefins such as polypropylene have low thermal stability and suffer from heat distortion problems when exposed to higher baking temperature for relatively long time (>20 minutes) essential for completing the cure of resin.

The restriction of curing temperature for powder coatings can be however alleviated by use of additional physical field such as UV or electron beam (EB) so the curing temperature can be lower while the coating performance and properties can be maintained. Such coatings are known as UV curable or EB curable coatings in powder form.

Electrostatic painting with wet paints or coatings also required conductive surface to make the charge wet paint droplet deposited on the grounded conductive surface. Also the process still involves the use of organic solvent and can not completely remove emission of the VOC, the electrostatic painting process does greatly improve the deposition efficiency resulting in reduction of paints or coating used and reduces the non recyclable waste paint The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY

In one aspect the invention provides a method of electrostatic coating, preferably electrostatic powder coating, of a polymer surface comprising:
  (i) oxidising at least part of the polymer surface;
  (ii) treating the oxidised polymer surface with (a) a polyamine compound and (b) an electroconductivity modifying agent reactive with the polyamine selected from the group consisting of mono-carboxylic acids comprising from one to twelve carbon atoms (preferably from one to eight carbon atoms); to increase the electroconductivity of the polymer surface; and
  (iii) electrostatically applying a coating, preferably a powder coating, to the treated polymer surface to bind the coating composition thereto.

In a further aspect the invention provides a method to enhance the adhesion of powder coating electrostatically deposited on the polymer surface according to the invention.

In another aspect the invention provides also a composition consisting of a polyamine and an electro conductivity modifying agent for improving the surface conductivity of polymers.

In another aspect the invention provides method to improve the surface conductivity of polymer for electrostatic painting with wet paint or coating.

BRIEF DESCRIPTION OF THE DRAWINGS

FIG. 1 shows the classification and percent area removed for surfaces of cross-cut areas from which flaking has occurred.

DETAILED DESCRIPTION

The invention relates to electrostatically coating a polymer surface. The particularly preferred coating is a powder coating. Powder coating refers to protective and/or decorative coating formed by application of powder to a substrate. The main difference between a conventional liquid paint and a powder coating is that the powder coating does not require a solvent to keep the binder and filler parts in a liquid suspension form. The coating is applied electrostatically and is then cured under heat to allow it to flow and form a "skin". The powder may be a thermoplastic or a thermoset polymer. It is usually used to create a hard finish that is often tougher than the conventional paint. The coating is normally a thermal curable resin but UV, electron beam (EB) or other physical field can also applied to assisting the curing of coatings at the lower temperature. In general the coating is heated to the melting point and UV or EB is applied to accelerate the curing of coatings.

The method of electrostatic coating of polymers according to this invention involves oxidising at least part of the surface of the polymeric material. Oxidation techniques include, corona discharge, flame treatment, non-depositing plasma treatment, atmospheric air plasma, chemical oxidation, UV irradiation and/or excimer laser treatment in the presence of an oxidising atmosphere such as, but not limited to: air, oxygen ($O_2$), ozone ($O_3$), carbon dioxide ($CO_2$), Helium (He), Argon (Ar), and/or mixtures of these gases. However, for the present method the technique of an electrical discharge for instance corona discharge, flame treatment, atmospheric air plasma and/or chromic acid treatment are preferred.

Suitable corona discharge energies range from 0.1-5000 mJ/mm$^2$ but more preferably 10-80 mJ/mm$^2$. Corona discharge treatment may be carried out in the presence of the following atmospheres: air, oxygen ($O_2$), ozone ($O_3$), carbon dioxide ($CO_2$), Helium (He), Argon (Ar), and/or mixtures of these gases. Suitable treatment times and discharge energies can be calculated using the following equations:
where $$E=Pn/Iv_1$$

or $$E=Pn/Iv_2$$

t=treatment time for a single pass of treatment under the electrode
d=electrode diameter
E=discharge energy
P=power energy
n=number of cycles of treated substrate moving under the electrode
l=length of treating electrode
$v_1$=speed of treating table
$v_2$=speed of conveyor tape (i.e. continuous treatment)

When non-depositing plasma glow discharge treatment is used, the range of suitable energy is 5-5000 Watts for 0.1 seconds to 30 minutes, but more preferably 20-60 Watts for 1 to 60 seconds.

Alternatively, flame treatment may be used to initially oxidise at least part of the surface of the polymer or polymer based material. The range of suitable parameters for the flame treatment are as follows: the oxygen ratio (%) detectable after combustion from 0.5% to 5%, preferably from 0.8% to 2%; treatment speed from 1 m/min to 800 m/min, preferably from 10 m/min to 100 m/min; treatment distance from 2 mm to 500 mm, preferably from 5 mm to 100 mm. Many gases are suitable for flame treatment. These include, but are not limited to: natural gases, pure combustible gases such as methane, ethane, propane, hydrogen, etc or a mixture of different combustible gases. The combustion mixture also includes air, any pure oxygen or oxygen containing gases.

The polyamine containing compound is generally reactive with the functional groups of the polymer surface which are introduced by oxidation and generally comprises at least four amine groups including at least two amine groups selected from primary and secondary amine groups. Examples of suitable polyamine compounds are described in our U.S. Pat. No. 5,922,161. The polyamines may be polymeric or non-polymeric and preferably have a molecular weight in the range of from 200 to 2,000,000.

The suitable polyamine compound can be organofunctional coupling agent containing amine functionality which is present as a polyamine compound oligomer as a result of partially crosslinking or small molecules but forms polyamine polymer after hydrolysis and crosslinking in solution or on the surface.

The polyamine is preferably a polymer selected from homopolymers containing the monomers, ethylenimine, allylamine, vinylamine, 4-aminostyrene, aminated acrylate/methacrylate, and copolymers made from a combination of these monomers or as a copolymers containing at least one of these monomers with any other suitable monomer such ethylene, propylene, acrylate/methacrylate and ethylene oxide. A preferred embodiment of this invention the uses polyethyleneimine PEI compounds, which may be linear or branched with a molecular weight range of 200 to 2,000,000, examples of which are Lupasol FC (MW=800), Lupasol G35 (MW=2,000), Lupasol G100 (MW=5,000), Lupasol WF (MW=25,000) or Lupasol PS (MW=750,000) and Lupasol SK (MW=2,000,000) (all BASF).

The preferred non-polymeric polyamine compounds include linear and carbon cyclic multi amine compounds. These compounds have 4 or more amine groups, with at least two of these amine groups being either primary or secondary amines. Examples of such compounds are triethylene tetraamine, tris (2-aminoethyl) amine, tetraethylene pentaamine, pentaethylene hexaamine, benzene tetraaminie.

The polyamine compounds can be used as single polyamine components or as combinations of two or more polyamine compounds described above. The concentration of the polyamine compound is typically between 0.01% to 50% by weight, preferably between 0.1% and 5% by weight with the most useful concentration range being 0.1% to 2% by weight.

The electroconductivity modifying agent modifies the polyamine bonded to the polymer surface to provide conditions for enhanced electron transfer. The electroconductivity modifying agent may also be referred to as a dopant as it interacts with the polyamine to provide functional groups for electron transfer at the surface of the polymer. The electroconductivity modifying agent is mono-carboxylic acid containing from 1 to 12 and preferably from 1 to 8 carbon atoms. The carboxylic acid may comprise other functional groups such as hydroxyl functional groups. The carboxylic acids are mono-carboxylic acids; that is, they contain a single carboxylic acid group and not two or more such groups.

The mono-carboxylic acid is generally aliphatic and may be saturated or unsaturated. Preferably the carboxylic acid comprises either a saturated aliphatic group or aliphatic comprising no more than one double bond.

Preferred mono-carboxylic acids are selected from formic acid and ($C_1$ to $C_7$ alkyl)carboxylic acids. The alkyl may be straight or branched chain alkyl.

Examples of the electroconductivity modifying agent include at least one mono-carboxylic acid of from 1 to 8 carbon atoms such as at least one selected from the group consisting of formic acid, acetic acid, propionic acid, butyric acid, valeric acid, caproic acid, acrylic acid, methacrylic acid and lactic acid.

Specific examples of more preferred $C_1$ to $C_8$ mono-carboxylic acids include acetic acid, propionic acid, butyric acid, valeric acid and caproic acid.

Specific examples of mono-unsaturated $C_1$ to $C_8$ carbon-boxylic acids include acrylic acid and methacrylic acid.

Specific examples of substituted $C_1$ to $C_8$ aliphatic mono-carboxylic acids include hydroxyl substituted $C_1$ to $C_8$ aliphatic carboxylic acids such as lactic acid.

The most preferred electroconductivity modifying agents are volatile organic acids which form ionic bond with the polyamine compounds and enhance the surface conductivity of treated polymeric surface. The majority of the organic acid is removed from the polymer surface after powder coating or paint is transferred to the surface and during the curing of powder coating resin or paint at the elevate temperature.

The examples of suitable organic acids falling into this group include, but are not limited to mono-carboxylic acids with short hydrocarbon chain such as acetic acid, propionic acid and butyric acid. Addition of other non volatile organic acids will enhance the surface conductivity, but the presence of amine salt at the surface/interface may have an adverse effect on the adhesion of coating subjected to high prolonged humidity or wet exposure and would not be applicable to external application or interior application but exposed to thermal hydrolytic conditions. In a particularly preferred embodiment, the carboxylic acid is selected from acetic acid, propionic acid and butyric acid.

Inorganic acids, in theory, do form strong ionic bonding with polyamine and increase the conductivity in solution but the film forming properties of such compositions on the surface is in general poor, resulting in relatively little improvement of surface conductivity. The presence of strong amine salt on the surface/interface also makes the surface/interface very hydrophilic and relatively weak under high humidity and wet exposure conditions, limiting their application to the dry conditions only.

The more preferred conductivity modifying agents are carboxylic acids selected from acetic acid, propionic acid and mixtures thereof.

The conductivity modifying agent may be applied to the polymer surface in a separate step prior to or, more preferably, during or after treatment with the polyamine. It is most preferred however, that the polymer surface be treated with a mixture of (a) the polyamine or organofunctional coupling agent or silane according to this invention and (b) the electroconductivity modifying agent.

The conductivity modifying agent is generally present in the treatment composition at the mole ratio (acid/amine) of from 0.05 to 10 and preferably a concentration of from 0.1% to 5 and most preferably from 0.5 to 2.

The polyamines are preferably applied as a solution in a suitable solvent. Examples of suitable solvents include water, alcohols and mixtures thereof. Wetting agents and/or non ionic surfactants can be added in small amount to improve the film forming properties of the solution on the polymeric surface, depending on the nature of polymers and the oxidation level required.

The rate at which the polyamine and electroconductivity modifier are applied is dependent on the desired results. Typically it is preferred that the total of polyamine is applied at a rate of less than 5 g per square meter of surface area, more preferably less than 2 g per square meter of surface area and still more preferably ranging from 0.05 to 2 g per square meter. Generally the dry thickness of the treatment composition will be less than three microns.

The method of the invention comprises a step of providing the polymer surface with surface functional groups.

The polymer surface may comprise homo-polymers, co-polymers, synthetic rubbers and their blends and alloys with other materials such as inorganic fillers, and matrix composites. These polymeric materials may be used as materials on their own or alternatively as an integral and uppermost part of a multi-layer laminated sandwich comprising any materials such as polymers, metals, ceramics or an organic coating on any type of substrate material. The term "polymer" includes thermoset and thermoplastic polymers and mixtures thereof. Examples are polyolefins and polyolefins based plastics, nylon, polycarbonate, PVC, polystyrene, polyester, ABS, acrylic polymer, epoxy, melamine, etc.

Examples of polyolefins which may be used in the process of the invention include:

1. Polymers of monoolefins and diolefins, for example polypropylene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (UL-DPE).
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.
4. Blends of the aforementioned may be blends of one or more of the aforementioned with other polymer where preferably at least 50% by weight is a polyolefin or blends of two or more of the polymers. It will be understood by those skilled in the art that the polyolefin composition may contain the types of processing aids and additives used in the art.

The polymer materials to be treated may be in the forms of flat sheets, films, complex shaped articles, particulate or powders, woven or non-woven fabrics, individual fibres and mixtures thereof. These can be solid polymeric mono-materials, laminated products or hybrid materials.

The powder coating is preferably heat cured on the polymer surface at a temperature of less than 180° C. and more preferably at a temperature in the range of from 110° C. to 140° C. for polyolefins based plastics. Suitable powder coating also includes UV or electron beam curable powder coatings. Suitable coating compositions for this use are known in the art. Preferred examples of coatings may be selected from the group consisting of polyester, epoxy, acrylic and mixture thereof.

The invention also provides method to enhance the adhesion of powder coating with the modified polymer surface. The polyamine acts as an adhesion promoter and reinforces the adhesion of coating to the oxidised polymer substrate.

The invention also provides a method to improve the surface conductivity of polymer for electrostatic painting process where wet paint and coating are used instead of powder.

In accordance with a further aspect the invention provides a composition for modifying the electroconductivity of a polymeric surface, the composition comprising:
(a) a polyamine or amino organofunctional coupling agent, and
(b) a conductivity modifying agent.

Details of the preferred polyamines, the preferred conductivity modifying agent and the preferred concentrations of the compounds (a) and (b) in the composition are described above.

The polyfunctional amine containing compounds may be contacted with the substrate surface during the surface oxidation process or subsequent to the oxidation.

The composition of the invention may in addition to components (a) and (b) contain further components for enhancing the reactivity or cross linking of the polyamine. Examples of cross linking agents are described in our copending International Application PCT/AU00/01272 the contents of which are herein incorporated by reference.

The invention will now be described with reference to the following examples. It is to be understood that the examples are provided by way of illustration of the invention and that they are in no way limiting to the scope of the invention.

EXAMPLES

Materials

Polypropylene based automotive grade plastic blends Corton PDR 1024/5 and Epalex PDR 7369 (Corton and Epalex are trademarks) were purchased from Polypacific Australia. The pellets were injection moulded into 3 mm thick plaques and subsequently cut into 75×100 mm samples. Full size automotive engine block covers fabricated as injection moulded, polypropylene-based components (General Motors V-8 and V-6 engine block covers) were obtained from an automotive OEM supplier. The engine block covers were cut into small plaques, approx. 60×90 mm for pilot line treatment, or were alternatively treated as full size components using an industrial scale robotic system. All specimens were cleaned with isopropanol and dried prior to surface treatment.

Commercially available powder coatings, Customcoat QP, Blue Gross (20 minutes @ 130° C.) and Customcoat QP Silver Matt (20 minutes @ 140° C.), were supplied by Dulux Powder Coatings-Orica Australia (Customcoat and Dulux are trademarks).

Flame Treatment:

Flame treatment was carried out using an Aerogen laboratory flame treatment unit equipped with an 8" burner fuelled with natural gas on a conveyor at a constant speed of 60 m/min (double pass). The distance from the sample surface to burner face was kept constant at 20 mm, and the air flow rate was maintained at 220 liters/min. The excess content of oxygen concentration in the flame was maintained at 0.4%.

Application of Chemical:

Application of graft chemical has been carried out on a conveyor line. Flame-treated polymer plaques are lined on the conveyor surface and subsequently passed under a spray nozzle at a specific speed, generally between 2 and 25 m/min. Graft chemicals were formulated in the form of aqueous solutions which were sprayed onto the samples using commercially available spray nozzles. The sample-to-nozzle distance was kept constant at 150 mm and the pressure of atomising air maintained at 1.5 bars. After spraying, the samples were dried either using infra-red lamps, or under ambient laboratory conditions.

Electrostatic Powder Coating

Surface modified polymer samples were powder coated in CSIRO laboratories using a robotised powder coating facility comprising: (1) custom-designed spray booth, (2) an X-Y motion Yamaha robot, and (3) ITW Gema electrostatic powder gun with electronic control unit. The powder spraying gun was fixed to the robotic arm and moved by the robot at a precisely controlled linear speed.

Multiple replicates of samples were electro-statically powder-coated using low-temperature curing powders supplied by Orica. The coating consistency was achieved by using a pre-set process parameters, i.e.: constant sample-to-gun nozzle distance, and linear speed. A metal plaque has been typically used as an internal reference material to ascertain that the electrostatic powder coating equipment remains in good operating condition. Successfully coated samples were baked in a curing oven under curing conditions specified by Orica for each powder. Cured samples were subsequently cooled under ambient conditions, and stored for further testing and characterisation. Powder coating density (g/m$^2$) was calculated from the samples weight gain after coating cure.

Surface Conductivity Measurement:

Surface conductivity and resistivity has been determined using a Keithley Electrometer 6517A with the Resistivity Test Fixture 8009 attachment. This electrometer utilises the pre-programmed alternating polarity DC-voltage test sequence (automatic testing programme available in this equipment). The method allows the high resistivity surfaces to be characterised reproducibly by allowing the background current to decay whilst taking measurements, and by using a four-point moving average to determine the true surface resistivity of the material. In this procedure, the test voltage of 500 Volts is applied during a measurement time of 15 seconds. Six conductivity measurements are taken, discarding the initial two measurements as the current reaches a steady-state, to determine the true conductivity of each sample. Multiple replicates are tested for each set of treatment conditions and chemical formulations.

The measurement conditions (e.g.: relative humidity and ambient temperature) are monitored and kept constant during all conductivity measurements.

Adhesion Assessment:

Cross hatch adhesion test according to ASTM D 3359-95A Test Method B was used for both dry and wet adhesion tests. The following protocol is used according to this method: (1) a lattice pattern of six perpendicular cuts [see FIG. 1] is made in the coating film to the substrate surface with a sharp razor blade; (2) a high-tack pressure sensitive adhesive tape (3M VHB 898) is firmly applied over the lattice; (3) the tape is rapidly removed from the tested specimen at the angle of 180 degrees; and (4) the quality of coating adhesion is evaluated by comparison with the quantitative description and illustration of the standard provided in FIG. 1. As illustrated in Table 1 and FIG. 1, the 0% removal of paint within the cross-hatch lattice is classified as pass (5B). Detachment of less than 5% of coating is also classified as pass (4B). Any higher percentage of coating removal than 5% is classified as a fail in the following categories: 5 to 15% loss of coating (3B); 15-35% (2B); 35-65% (1B); and greater than 65% (0B).

TABLE 1

Classification of peel off adhesion test results
"ASTM D 3359-95A Test Method B".
CLASSIFICATION OF ADHESION TEST RESULTS

| Classification | Percent Area Removed |
|---|---|
| 5B | 0% |
| 4B | Less than 5% |
| 3B | 5-15% |
| 2B | 15-35% |
| 1B | 35-65% |
| 0B | Greater than 65% |

It is noted that FIG. 1 shows the same classification as in TABLE 1, along with a column showing the surface of cross-cut area from which flaking has occurred for six parallel cuts and adhesion range by percent.

For wet adhesion tests the specimens are cross-hatch cut and then exposed to the atmosphere of controlled humidity, or alternatively immersed in room temperature or hot water.

Two following "wet exposure" conditions were utilised for determining the quality of adhesion:
1. Exposure to 100% humidity: the coated samples are placed in a water bath enclosure above the water level for 72 hours at 38° C. at 15 degrees inclination off the normal surface, and
2. Immersion in hot water: 3-day immersion of coated samples in water bath at 38° C.

After exposure to either of the above exposure condition the specimens were touch-dried with tissues and then dried in ambient air for 15 minutes before the tape peel off test was carried out.

Example 1

Automotive grade polypropylene plaques (Corton PDR 1024/5) were surface-treated by flame and then sprayed twice with 1% solution of polyethylene imine (PEI) in water, or alternatively with a water-based solution containing 1% of polyethylene imine and 1% acetic acid (see Table 2 for details of the compositions used) at conveyor speed 8 m/min and spraying flow rate 28 ml/min. Surface resistivity of treated specimens was measured after 1 hour of ambient air drying. The electrostatic powder coating was carried out using Dulux-Orica Customcoat QP Blue coating. The powder coating density attained for each type of surface treatment applied to polypropylene (Corton PDR 1024/5) is also listed in Table 2.

TABLE 2

Substrate surface resistivity and powder coating density of polypropylene surface (Corton PDR 1024/5) modified according to the invention

| Surface treatment | Substrate surface resistivity ohm/square | Powder coating density g/m$^2$ |
|---|---|---|
| Untreated | $1.4 \times 10^{16}$ | <3 |
| Flame (F) | $2.5 \times 10^{15}$ | <3 |
| (F) + 1% FG | $9.6 \times 10^{11}$ | 15.6 |
| (F) + 1% G35 | $5.1 \times 10^{11}$ | 17.1 |
| (F) + 1% G100 | $3.1 \times 10^{11}$ | 20.1 |
| (F) + 1% WF | $4.0 \times 10^{11}$ | 21.3 |
| (F) + 1% FG + 1% acetic acid | $9.27 \times 10^{7}$ | 61.7 |
| (F) + 1% G35 + 1% acetic acid | $1.1 \times 10^{8}$ | 59.0 |
| (F) + 1% G100 + 1% acetic acid | $1.1 \times 10^{8}$ | 58.9 |
| (F) + 1% WF + 1% acetic acid | $9.6 \times 10^{7}$ | 60.1 |

The molecular weight for the polyamine listed in Table 2 above are 800 (Lupasol FC]; 2,000 (Lupasol G35); 5,000 (Lupasol G100); 25,000 (Lupasol WF).

The following can be noted from the data provided in Table 2:
1. Flame treatment alone does not improve polymer surface conductivity and accordingly the electrostatic powder coating is unsuccessful on either untreated or flame treated specimens.
2. Application of PEI alone onto the surface-oxidised polymer leads to an increase of surface conductivity. However, the resultant conductivity improvement is not sufficient for adequate powder coating which is uneven in thickness, patchy and consequently does not exhibit acceptable coating appearance and quality.
3. The addition of a conductivity promoter in the form of acetic acid to the PEI solution significantly increases surface conductivity of polymer in comparison with surfaces treated with PEI alone (approximately a 3 to 4 orders of magnitude improvement of surface conductivity). Consequently, electrostatic powder coating carried out on surfaces treated by the solution according to this invention (PEI and acetic acid) is achieved successfully, as signified by high coating density and the evenness of colours across the entire sample surface.

Example 2

Another type of automotive grade polypropylene plaques (Epalex PDR 7369) were surface treated as specified in Example 1, and the results obtained are listed in Table 3. Successful electro-static powder coating was achieved on the Epalex substrate treated according to this invention, as demonstrated by the data provided in Table 3.

TABLE 3

Substrate surface resistivity and powder coating density of polypropylene surface (Epalex) modified according to the invention.

| Surface treatment | Substrate surface resistivity ohm/square | Powder coating density g/m$^2$ |
|---|---|---|
| Untreated | $5.8 \times 10^{15}$ | <3 |
| Flame (F) | $5.1 \times 10^{15}$ | <3 |
| (F) + 1% FG + 1% acetic acid | $1.5 \times 10^{8}$ | 58.8 |
| (F) + 1% G35 + 1% acetic acid | $1.2 \times 10^{8}$ | 60.0 |
| (F) + 1% G100 + 1% acetic acid | $1.3 \times 10^{8}$ | 59.3 |
| (F) + 1% WF + 1% acetic acid | $1.3 \times 10^{8}$ | 59.4 |

Example 3

Full size engine block covers (GM V-6 engine) were surface treated according to this invention using a robotise application system. The treatment comprised flame treatment, and spraying with a water-based solution containing 1% PEI (WF: MW=25,000)+1% acetic acid. Successful powder coating was achieved on the engine cover treated according to the invention2.

Example 4

Automotive grade polypropylene plaques (Corton and Epalex) and test plaques cut out from a full size engine block covers were surface treated according to the invention and subsequently powder coated with two types of Dulux-Orica powder coatings: QP Blue Gross, and Customcoat QP Silver Matt.

Powder coated specimens were cross-hatched and subsequently the quality of adhesion of the coating was assessed according to ASTM D 3359-95A Test Method B using a 3M VHB high-tack pressure-sensitive adhesive tape.

For comparison purposes, flame only treated specimens were also coated with the dusted powder resin (applied with help of a sieve) which was then cured under conditions identical with those used for the substrates treated according to this invention.

It has been found that the flame only treated samples exhibited 100% loss of the coating subjected to the peel-off test according to ASTM D 3359-95A Test Method B, whilst no loss of powder coating was detected for the specimens treated according to this invention using the following surface treatment solutions: (a) 1% of FG [MW=800]+1% acetic acid; (b) 1% of G35 [MW=2,000]+1% acetic acid: (c) 1% of G100 [MW=5,000]+1% acetic acid, and (4) 1% of WF [MW=25,000]+1% acetic acid.

The above data further demonstrate that the surface treatment according to the current invention improves not only the surface conductivity and the effectiveness of powder coating transfer (as already illustrated by the data in Tables 2 and 3, but also the adhesion of coatings to the polymeric substrates treated according to this invention.

Example 5

Test plaques cut from a polypropylene-based moulding of an engine block cover (GM V-8 engine) were surface treated according to this invention using flame treatment followed by spray with the solution containing 1% PEI (WF: MW=25,000)+1% acetic acid. Surface-treated plaques were subsequently electrostatically powder coated with the Customcoat QP Silver Matt. All coated specimens were then exposed to wet exposure conditions as follows:

1. 100% humidity at 38° C. for 72 hours,
2. Hot water immersion at 38° C. 72 hours,
3. 100% humidity at 38° C. for 72 hours plus water jet test,
4. Hot water immersion at 38° C. 72 hours plus water jet test.

Cross-hatch adhesion tests in accordance with ASTM D 3359-95A Test Method B were carried out on the samples exposure to the above conditions. The results are provided in Table 4.

TABLE 4

Powder coating adhesion (cross-hatch testing: see Table 1 and FIG. 1 for adhesion quality ranking) after wet exposure of coated specimens.

| Wet exposure conditions | Adhesion rating |
| --- | --- |
| 1. 100% humidity at 38° C. for 72 hours | 5B |
| 2. Hot water immersion (38° C.) | 5B |
| 3. 100% humidity at 38° C. for 72 hours plus water jet test | 5B |
| 4. Hot water immersion (38° C.) 72 hours plus water jet test | 5B |

It can be seen from the data provided in Table 4 that excellent adhesion of powder coating to the polypropylene substrate were achieved following surface treatment according to the current invention.

Example 6

Automotive grade polypropylene plaques (Epalex) were surface-treated by flame and then sprayed with 1% solution of polyethylene imine (PEI) in water, or alternatively with a water-based solution containing 1% of polyethylene imine and 1% organic carboxylic acid (see Table 2 for details of the compositions used). Surface resistivity of treated specimens was measured after 1 hour of ambient air drying. The electrostatic powder coating was carried out using Dulux-Orica Customcoat QP Blue coating. Results of surface resistivity and the powder coating density attained for each treatment were presented in Table 5.

TABLE 5

Surface resistivity and powder coating density of polypropylene (Epalex) modified according to the invention.

| Surface treatment | Substrate surface resistivity ohm/square | Powder coating density g/m$^2$ |
| --- | --- | --- |
| Untreated | $5.8 \times 10^{15}$ | <3 |
| Flame (F) | $5.1 \times 10^{15}$ | <3 |
| (F) + 1% FG | $9.6 \times 10^{11}$ | 9.6 |
| (F) + 1% FG + 1% Acrylic acid | $3.7 \times 10^{8}$ | — |
| (F) + 1% FG + 1% Propionic acid | $2.6 \times 10^{8}$ | — |
| (F) + 1% FG + 1% Lactic acid | $2.9 \times 10^{10}$ | 57.8 |
| (F) + 1% G35 | $5.1 \times 10^{11}$ | 17.1 |
| (F) + 1% G35 + 1% Propionic acid | $3.94 \times 10^{10}$ | — |
| (F) + 1% G35 + 1% Butyric acid | $5.97 \times 10^{10}$ | — |
| (F) + 1% G100 | $3.1 \times 10^{11}$ | 20.1 |
| (F) + 1% G100 + 1% Lauric acid | — | 53.1 |

The results obtained further demonstrate that addition of carboxylic acid enhancing the surface electro conductivity and improving the electrostatic powder coating.

Example 7

Automotive grade polypropylene plaques (Epalex) were surface-treated by flame and then sprayed with 1% solution of polyethylene imine (PEI,) in water, or alternatively with a water-based solution containing 1% of polyethylene imine and 1% inorganic acid (Hydrochloric acid or phosphoric acid or sulfuric acid). Surface resistivity of treated specimens was measured after 1 hour of ambient air drying. The electrostatic powder coating was carried out using Dulux-Orica Customcoat QP Blue coating. Results of surface resistivity and the powder coating density attained for each treatment were presented in Table 6.

TABLE 6

Surface resistivity and powder coating density of polypropylene (Epalex) modified according to the invention.

| Surface treatment | Substrate surface resistivity ohm/square | Powder coating density g/m² |
|---|---|---|
| Untreated | $5.8 \times 10^{15}$ | <3 |
| Flame (F) | $5.1 \times 10^{15}$ | <3 |
| (F) + 1% WF | $4.0 \times 10^{11}$ | 21.3 |
| (F) + 1% WF + 1% HCl | — | 22.8 |
| (F) + 1% FG + 1% $H_3PO_4$ | — | 20 |
| (F) + 1% FG + 1% $H_2SO_4$ | — | 15.5 |

The results obtained demonstrate that addition of inorganic acid does not improve the electrostatic powder coating as the coating density was similar or less than the PEI only surface treatment and the coating. The resultant conductivity improvement is not sufficient for adequate powder coating which is uneven in thickness, patchy and consequently does not exhibit acceptable coating appearance and quality. As discussed earlier, while addition of inorganic acid can enhance the ionic conductivity of PEI molecule, the higher hydrophilicity of PEI reacted with the acid may result in poorer film forming of PEI on the polymer surface and offset any conductivity gained.

The invention claimed is:

1. A method of electrostatic coating of a polymer surface comprising:
   (i) oxidising at least part of the polymer surface;
   (ii) treating the oxidised polymer surface with (a) a polyamine compound and (b) an electoconductivity modifying agent reactive with the polyamine selected from the group consisting of aliphatic mono-carboxylic acids comprising from 1 to 8 carbon atoms; to increase the electroconductivity of the polymer surface; and
   (iii) electrostatically applying a coating to the treated polymer surface and curing the coating to bind the coating to the treated polymer surface.

2. A method according to claim 1, wherein the monocarboxylic acids comprising from one to eight carbon atoms are selected from the group consisting of formic acid and $C_1$ to $C_7$ alkyl carboxylic acids.

3. A method according to claim 1 wherein the mono-carboxylic acid of from 1 to 8 carbon atoms comprises at least one selected from the group consisting of formic acid, acetic acid, propionic acid, butyric acid, valeric acid, caproic acid, acrylic acid and methacrylic acid.

4. A method according to claim 1, wherein the mono-carboxylic acids are selected from the group consisting of acetic acid, propionic acid and mixtures thereof.

5. A method according to claim 1, wherein the coating is an electrostatically applied powder coating.

6. A method according to claim 1, wherein the step of oxidising at least part of the polymer surface comprises flame treatment.

7. A method according to claim 1 wherein the polyamine is a polymeric amine having a molecular weight in the range of from 200 to 2,000,000.

8. A method according to claim 1 wherein the polyamine is a polyethyleneimine having a molecular weight in the range of from 800 to 25000.

9. A method according to claim 1, wherein the polyamine compound is applied to the polymer surface in a liquid composition having a concentration of polyamine in the range of from 0.01% and 10%.

10. A method according to claim 1 wherein the electroconductivity modifying agent is applied from a solution comprising a concentration of the electroconductivity modifying agent in a molar ratio to amine from 0.1 to 10.

11. A method according to claim 1 wherein the polyamine is applied as a solution in a solvent selected from the group consisting of water, alcohols and mixtures thereof.

12. A method according to claim 1 wherein the polymer is selected from the group consisting of thermoset and thermoplastic polymers and mixtures thereof.

13. A method according to claim 1 wherein the polymer comprises a polyolefin selected from the group consisting of low density polyethylene (LDPE), polypropylene (PP), high density polyethylene (HDPE), ultra high molecular weight polyethylene (UHMWPE); and blends thereof with other polymers or rubbers.

14. A method according to claim 1 wherein the step of electrostatically coating the treated polymer surface uses a powder coating resin exhibiting the melting point not greater than that of the heat distortion temperature of the coated polymer.

15. A method according to claim 14 wherein the polymer surface comprises polypropylene and the powder coating is subject to a temperature in the range of 110 to 140° C. to cure the coating on the polymer surface.

* * * * *